(12) United States Patent
Robshaw et al.

(10) Patent No.: US 8,543,812 B2
(45) Date of Patent: Sep. 24, 2013

(54) EFFICIENT AND SECURE CRYPTOGRAPHIC COUPON RELOADING

(75) Inventors: Matthew Robshaw, Paris (FR); Henri Gilbert, Bures sur Yvette (FR); Marc Girault, Caen (FR); Loic Juniot, Bougy (FR)

(73) Assignee: France Telecom, Paris (FR)

( * ) Notice: Subject to any disclaimer, the term of this patent is extended or adjusted under 35 U.S.C. 154(b) by 588 days.

(21) Appl. No.: 12/666,873

(22) PCT Filed: Jun. 26, 2008

(86) PCT No.: PCT/EP2008/058169
§ 371 (c)(1),
(2), (4) Date: Dec. 28, 2009

(87) PCT Pub. No.: WO2009/003908
PCT Pub. Date: Jan. 8, 2009

(65) Prior Publication Data
US 2010/0185851 A1 Jul. 22, 2010

(30) Foreign Application Priority Data
Jun. 29, 2007 (EP) .................................... 07301190

(51) Int. Cl.
*H04L 29/06* (2006.01)
(52) U.S. Cl.
USPC .............. 713/159; 713/168; 380/46; 380/270
(58) Field of Classification Search
USPC .......... 713/159, 168, 170; 340/5.8; 708/250; 380/46, 270
See application file for complete search history.

(56) References Cited

U.S. PATENT DOCUMENTS
7,233,664 B2 * 6/2007 Soliman ......................... 380/44

2004/0190718 A1 9/2004 Dacosta
(Continued)

FOREIGN PATENT DOCUMENTS
EP 0 651 710 A1 6/1995

OTHER PUBLICATIONS

Calmels et al., "Low-Cost Cryptography for Privacy in RFID Systems," Smart Card Research and Advanced Applications Lecture Notes in Computer Science, LNCS, Springer-Verlag, BE, vol. 3928, pp. 237-251 (2006).

McLoone et al., "Public Key Cryptography and RFID Tags," Topics in Cryptology—CT-RSA 2007 Lecture Notes in Computer Science, LNCS, Springer Berlin Heidelberg, BE, vol. 4377, pp. 372-384 (Feb. 7, 2007).

(Continued)

*Primary Examiner* — Hadi Armouche
(74) *Attorney, Agent, or Firm* — Drinker Biddle & Reath LLP

(57) ABSTRACT

A system and a method for cryptographic reduced-coupon reloading are provided, where a coupon includes a pseudo-random number $r_i = PRF_K(i)$, where i is an index for labeling the coupon, PRF is a predetermined pseudo-random function and K is a regeneration key, and a "reduced-coupon" $x_i = f(r_i)$, where $f$ is a predetermined one-way function, where: a candidate device and a second device acquire a common value of a token T, the candidate device transmits a verification value $v_T$ to the second device, the second device verifies whether the verification value is equal to $PRF'_Q(T)$, where PRF' is a predetermined keyed pseudo-random function identical to, or derived from, the pseudo-random function PRF, where Q is an authentication key owned by the second device and known to the candidate device provided the candidate device is a legitimate reloading device, and if the verification is positive, one or several reduced-coupon(s) provided by the candidate device are stored in the second device.

19 Claims, 1 Drawing Sheet

(56) References Cited

U.S. PATENT DOCUMENTS

| | | | |
|---|---|---|---|
| 2005/0180315 A1* | 8/2005 | Chitrapu et al. | 370/208 |
| 2005/0210251 A1* | 9/2005 | Nyberg et al. | 713/169 |
| 2006/0087407 A1* | 4/2006 | Stewart et al. | 340/10.52 |
| 2010/0228986 A1* | 9/2010 | Robshaw et al. | 713/182 |
| 2011/0107102 A1* | 5/2011 | Canard et al. | 713/170 |

OTHER PUBLICATIONS

Piramuthu, "Protocols for RFID tag/reader authentication," Decision Support Systems, Elsevier Science Publishers, Amsterdam, NL, vol. 43 (3), pp. 897-914 (Mar. 27, 2007).

* cited by examiner

EFFICIENT AND SECURE CRYPTOGRAPHIC COUPON RELOADING

CROSS-REFERENCE TO RELATED APPLICATIONS

This application is the U.S. national phase of the International Patent Application No. PCT/EP2008/058169 filed Jun. 26, 2008, which claims the benefit of the European Patent Application No. 07301190.0 filed Jun. 29, 2007, the entire content of which is incorporated herein by reference.

FIELD OF THE INVENTION

The present invention generally relates to asymmetric (also known as "public key") cryptographic protocols such as authentication or electronic signature. More particularly, it provides a method and a system for authentication of a coupon-reloading device by a coupon-consuming device.

The invention can advantageously be applied to coupon-consuming devices contained in RFID ("Radio-Frequency Identification") tags.

BACKGROUND OF THE INVENTION

Several cryptographic algorithms can be used in such a manner that some device which is relatively less powerful (computationally speaking), plays the role of a "prover" in relation to another, more powerful, device playing the role of a "verifier". Such algorithms are of particular interest to deployments that use computationally-weak prover devices such as RFID tags communicating with much more powerful verifier devices such as tag-readers.

As is well-known in the art, one way to reduce computations on a device is—whenever applicable—by the use of cryptographic "coupons". A coupon comprises, first, a randomly chosen number r and, second, a "reduced-coupon" x such that $x=f(r)$, where $f$ is a one-way function the calculation of which requires intensive computations (such as modular exponentiations). An example of such a cryptographic algorithm is the well-known "Digital Signature Algorithm" DSA (Standard FIPS 186-2 published by the National Institute of Standards and Technology), wherein $x=(g^r \bmod p) \bmod q$, where p and q are prime numbers and g is an integer derived from p and q; another example is the "GPS" algorithm, wherein $x=g^r \bmod n$, where n is a large integer, and g is an integer (typically much) smaller than n (for a detailed description of some variants of GPS, see for example International Standards ISO/IEC 9798-5 and 14888-2).

In their article titled "*Public Key Cryptography and RFID Tags*", M. McLoone and M. J. B. Robshaw show indeed, based on a detailed analysis of the GPS algorithm, that public-key cryptography can advantageously be implemented in low-cost RFID tags.

Thus, whenever a computationally-weak prover device enters a cryptographic protocol using such an algorithm, it may use a coupon in order to reduce computations, thereby significantly reducing the duration of the protocol.

Usually, a set of coupons (r,x) is downloaded in the coupon-consuming device during the device fabrication process. Once this set of coupons has been consumed, one may either simply throw away the device if its cost of fabrication is low enough, or else have the coupon-consuming device itself compute a new set of coupons, or else have a computationally-powerful device compute a new set of coupons which are then downloaded in the coupon-consuming device.

However, it must be born in mind that the number of successive protocols in which a coupon-consuming device can enter is limited by the amount of memory required for storing the coupons. It is hence desirable to reduce the amount of memory occupied by each coupon. Such an improvement is actually known: it consists in storing in the coupon-consuming device during the fabrication process a set of reduced-coupons $x_i=f(r_i)$ (where i is an index for labeling the coupon), but not the corresponding random numbers $r_i$, which are, instead, successively (viz., keeping with successive values of the index i) regenerated in the device whenever needed for entering a cryptographic protocol. This may be achieved for example by having the device calculate $r_i=PRF_K(i)$, where K is a "regeneration key" owned by the device, and PRF is a keyed pseudo-random function the calculation of which requires only light computations.

In view of the above, it may be surprising to notice that the reloading of a coupon-consuming device with a set of reduced-coupons only, by connecting it to a computationally-powerful reloading device, has never been considered so far.

One reason for this may be that in most practical deployments, the communications environment is insufficiently secured. There exists therefore a danger that a device may inadvertently request reloading from a fake or compromised coupon-reloading device, which will attempt to provide phoney, arbitrarily chosen "reduced-coupons". Since an attacker does not know the secret key K used in the calculation of the pseudo-random function $PRF_K$, it is unable to calculate the pseudo-random numbers $r_i=PRF_K(i)$; thus, any such "reduced-coupon" subsequently used by the coupon-consuming device in a cryptographic protocol with a verifier device will be computationally unrelated to the number $r_i$ concurrently used. This represents a so-called "denial-of-service" attack, since it essentially disrupts the regular operation of the coupon-consuming device after reloading.

SUMMARY OF THE INVENTION

There is therefore a need for a safe method for allowing a first device to provide reduced-coupons to a second device, while making sure that the first device is a legitimate provider of reduced-coupons to the second device.

In a first aspect of the present invention, a method is provided for cryptographic coupon reloading, wherein a coupon comprises, on one hand, a pseudo-random number $r_i=PRF_K(i)$, where i is an index for labeling the coupon, PRF is a predetermined pseudo-random function and K is a regeneration key, and, on the other hand, a "reduced-coupon" $x_i$ such that $x_i=f(r_i)$, where $f$ is a predetermined one-way function. This method comprises the following steps:

a candidate device and a second device acquire a common value of a token T, said candidate device transmits a verification value $v_T$ to the second device, the second device verifies whether said verification value $v_T$ is given by $v_T=PRF'_Q(T)$, where PRF' is a predetermined keyed pseudo-random function identical to, or derived from, said pseudo-random function PRF, and where Q is an authentication key owned by the second device and known to the candidate device provided the candidate device is a legitimate reloading device, and if the verification is positive, one or several reduced-coupon(s) provided by the reloading device are stored in the second device.

Thus, the present invention prevents attacks, such as denial-of-service attacks, by allowing the coupon-consuming device to authenticate the coupon-reloading device.

Classically known solutions for authentication are based either on secret-key algorithms such as the well-known "Advanced Encryption Standard" AES (Standard FIPS 197 published by the National Institute of Standards and Technology), or public-key algorithms such as DSA or RSA (for a detailed description of RSA, see the article by R. L. Rivest, A. Shamir, and L. M. Adleman titled "*A Method for Obtaining Digital Signatures and Public-key Cryptosystems*", Communications of the ACM, pages 120-126, volume 21, number 2, 1978). These classical solutions are however inconvenient because they require additional circuitry in the verifier device, and furthermore require intensive computations, which implies that the verifier device must operate with a powerful (crypto-)processor.

In contrast, the authors of the present invention have realized that, since authentication protocols may rely on pseudo-random functions, and since such a function, namely the pseudo-random function PRF mentioned above, is already originally provided in many coupon-consuming devices for the purpose of optimized coupon storage, it would be very convenient if one could use, for the purpose of authentication, the same (or a derived) one-way function as the one used for optimized coupon storage.

This is achieved by the present invention. As a result, authentication may be implemented without having to provide coupon-consuming devices with any substantial additional circuitry. Furthermore, it should be noted that one can nowadays efficiently implement a pseudo-random function in an electronic device by means of a circuitry of fairly small size.

The method according to the invention is therefore easy to implement. After successfully authenticating a reloading device, a coupon-consuming device will thus be able to refresh its supply of reduced-coupons in an efficient and secure manner.

In a second aspect of the present invention, an electronic circuit containing a processor and a memory is provided. This electronic circuit is programmed for executing, as the second device, a method as succinctly described above.

In a third aspect of the present invention, an ASIC (Application Specific Integrated Circuit) is provided. This ASIC contains micro-components allowing it to execute, as the second device, a method as succinctly described above.

In a fourth aspect of the present invention, a portable object capable of exchanging data with a terminal is provided. This portable object comprises an electronic circuit or an ASIC as succinctly described above, and is capable of storing reduced-coupons, a regeneration key K and an authentication key Q. In particular, as explained above, this portable object can advantageously be an RFID tag.

In a fifth aspect of the present invention, a terminal capable of exchanging data with a portable object is provided. This terminal comprises a data-processing device programmed for implementing, as the reloading device, a method as succinctly described above.

In a sixth aspect of the present invention, a system for cryptographic coupon reloading is provided. This system comprises a portable object and a terminal as succinctly described.

In a seventh aspect of the present invention, non-removable, or partially or totally removable data storage means are provided. These data storage means contain electronic data-processing program code instructions for executing the steps of a method as succinctly described above.

Finally, in an eight aspect of the present invention, a computer program is provided. This computer program contains instructions such that, when said program controls a programmable data-processing device, said instructions cause said data-processing device to execute a method as succinctly described above.

The advantages of these electronic circuit, ASIC, portable object, terminal, system, data storage means and computer program are essentially the same as the advantages of the method according to the invention.

Furthermore, it is possible, according to particular embodiments of the invention described below, to satisfy further desirable constraints.

BRIEF DESCRIPTION OF THE DRAWINGS

The invention will be explained more fully below in connection with particular embodiments provided as non-limitative examples, and with reference to the drawings, in which.

DETAILED DESCRIPTION

Figure 1:
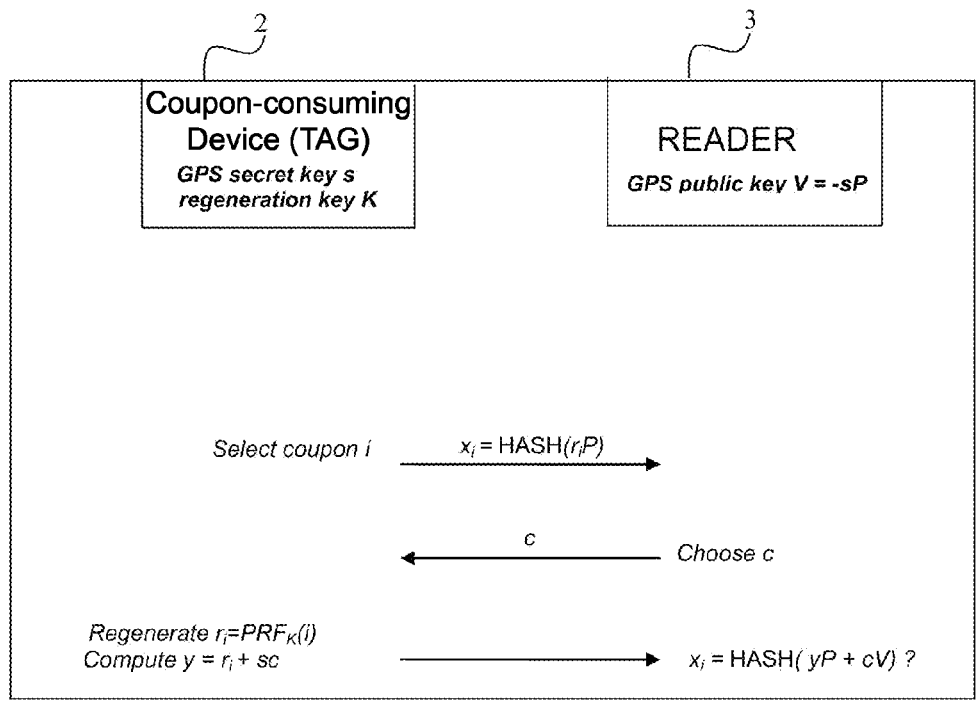
FIG. 1 shows a known way to use coupons in a cryptographic protocol.

FIG. 1 shows how coupons may be used in a cryptographic protocol. The protocol shown here, as an exemplary illustration, is an authentication of a tag 2 by a tag-reader 3 according to the above-mentioned GPS algorithm.

In a first, so-called "engagement" step, the tag 2 selects a new value of index i, and sends to the tag reader 3 the corresponding stored "reduced-coupon" $x_i = f(r_i)$, where $f$ is a predetermined one-way function.

The one-way function $f$ may for example be such that $x_i = \text{HASH}(r_i \cdot P)$, where P denotes a point on a predetermined elliptic curve known as a "generator", $(r_i \cdot P)$ denotes adding the point P to itself $r_i$ times using elliptic-curve addition, and HASH denotes a cryptographic hash function such as the Secure Hash Standard SHA-1 (Standard FIPS 180-2 published by the National Institute of Standards and Technology).

In a second, so-called "challenge" step, the tag-reader 3 sends a random value c to the tag 2.

In a third, so-called "response" step, the tag 2 sends to the tag-reader 3 a value $y = r_i + s \cdot c$, where s is the tag's secret (also called "private") GPS key.

The number $r_i$ (which was originally used to calculate the corresponding reduced-coupon) is here regenerated according to $r_i = \text{PRF}_K(i)$, where PRF is a keyed pseudo-random function and K is a regeneration key. The regeneration key K may be entirely distinct from said secret key s, or it may be derived from it.

This pseudo-random function may conveniently be implemented in the tag by means of a low-cost block cipher algorithm. Alternatively, it might be implemented as a stream cipher algorithm using the regeneration key K as a seed, and the labeling index i as an initialization vector (it will be recalled here that an "initialization vector" is a parameter allowing one to re-use several times the same seed in order to generate several distinct pseudo-random suites).

Finally, in a fourth, so-called "verification" step, the tag-reader 3 checks that $x_i = \text{HASH}(y \cdot P + c \cdot V)$, where $V = -s \cdot P$ is the tag's public GPS key.

Equivalently, one may use instead the following set of equations:

$$y = r_i - s \cdot c, x_i = \text{HASH}(y \cdot P - c \cdot V), \text{and } V = +s \cdot P.$$

Figure 2:
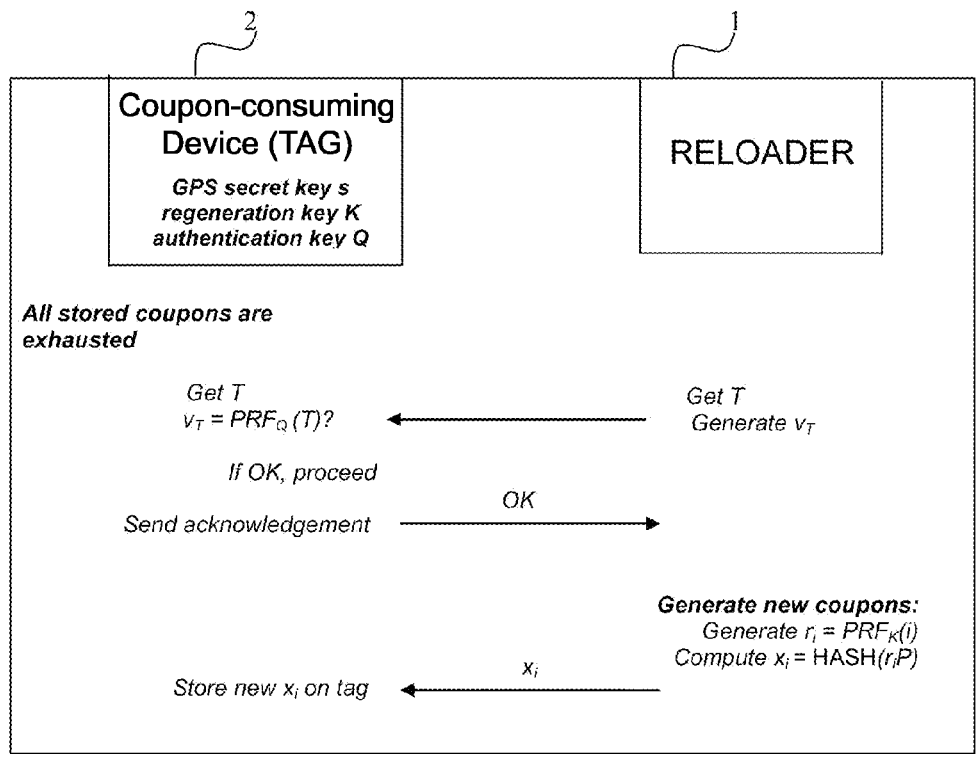
FIG. 2 shows an exemplary method for downloading coupons into a device according to the invention.

FIG. 2 shows an exemplary method for downloading coupons from a coupon-reloading device 1 into a coupon-consuming device 2.

The reloading device 1 may be any device such as a stand-alone machine, an RFID tag-reader behaving as a proxy with a dedicated link to some trusted central authority, or a trusted computing environment such as the SIM or USIM card in a cellular telephone.

The coupon-consuming device 2 may for example be an RFID tag.

When the tag 2 has exhausted all its previously stored coupons, or reached a predetermined low amount of stored coupons, it is put in communication with a reloading device 1. After identifying, and possibly also authenticating, the tag 2, the reloading device 1 obtains the tag's authentication key Q. This authentication key Q must, of course, be available to any legitimate reloading device 1. No assumption needs be made however on the method used for delivering a copy of the authentication key Q to the reloading device 1; this can be done by a variety of means, such as a dedicated secure link to some trusted central authority.

The reloading device 1 and the tag 2 then undergo an authentication procedure according to the present invention. If authentication is successful, the tag 2 sends an acknowledgement message to the reloading device 1. Finally, a certain number of reduced-coupons computed by the reloading device 1 are stored in the tag 1.

We now detail the above-mentioned authentication procedure.

According to the present invention, one uses, for the purpose of this authentication, a keyed pseudo-random function PRF'. According to the invention, this pseudo-random function PRF' is the same as, or derived from, the pseudo-random function PRF used for regeneration. The expression "derived from" means here that PRF' might, for example, be essentially identical to PRF but possess a different behaviour, for instance, due to distinct associated keys; PRF' might, as another example, include some minor algorithmic changes with respect to PRF such as, for instance, changes to the setting of feedback taps in a shift register-based PRF, or changes to S-boxes in a block cipher-based PRF.

Notably, the authentication key Q need not be identical to the regeneration key K; indeed, it might be generated independently of K, or it might be derived in a cryptographically more or less complex way from K (for example, Q may be derived from K by inverting the least-significant bit, or by inverting all bits, and so on).

In the particular case where the pseudo-random function PRF' is implemented as a stream cipher algorithm, one may use the authentication key Q as a seed, and the token T (see below) as an initialization vector.

According to a first embodiment, the authentication procedure between the second device 2 and a candidate device 1 comprises the following steps:

the second device 2 transmits a token T to the candidate device 1, the candidate device 1 transmits a verification value $v_T$ to the second device 2, and the second device 2 checks that said verification value $v_T$ is such that $v_T = PRF'_Q(T)$.

In some environments, there may be a risk of an illegitimate device 1' receiving from the second device a token T, and sending to the second device a verification value $v_T$, wherein these values for the token T and the verification value $v_T$ had previously been intercepted by the illegitimate device 1' during an exchange between the second device 2 and a legitimate reloading device 1. This is known in the art as a "replay attack". In this case, one needs to ensure that the second device 2 never sends to a candidate device 1, as token T, a previously used value. One non-limiting way to achieve this is to implement the calculation of the token T by means of a counter.

Thus, in order to ensure freshness of each token, a counter may be provided in the second device 2; however, it should be noted that a counter is likely to be required anyways for incrementing the coupon index i. The same counter could be re-used for both functionalities, or one could have different counter values sharing the same circuitry.

According to a second embodiment, the authentication procedure between the second device 2 and a candidate device 1 comprises the following steps:

the candidate device 1 transmits a token T and a verification value $v_T$ to the second device 2, and the second device 2 checks that said verification value $v_T$ is such that $v_T = PRF'_Q(T)$.

Here again, there may be, in some environments, the risk of a "replay attack", that is the risk, in the present embodiment, of an illegitimate device 1' sending to the second device a token T and a verification value $v_T$, wherein these values for the token T and the verification value $v_T$ had previously been intercepted by the illegitimate device 1' during an exchange between the second device 2 and a legitimate reloading device 1. Then one needs to ensure that the second device 2 never accepts from a candidate device 1, as token T, a value which was previously used. One non-limiting way to achieve this is by providing the second device 2 with a counter, so that the second device 2 may check that the value of the token T just received from the candidate device 1 is strictly greater than the current counter value.

According to a third embodiment, the current value and any necessary increments of the token T are managed on-line by a trusted central authority, so that a legitimate reloading device 1 and the second device 2 can each know the value of the next-to-be-used value of token T by means of their connection to this centre, without having to exchange this value directly between themselves. In this third embodiment, the authentication procedure between the second device 2 and a candidate device 1 comprises the following steps:

the candidate device 1 transmits a verification value $v_T$ to the second device 2, and the second device 2 checks that said verification value $v_T$ is such that $v_T = PRF'_Q(T)$.

According to a fourth embodiment, the token T results from a predetermined combination (for example, the concatenation) of a first number $T_1$ and of a second number $T_2$; furthermore, the second number $T_2$ is transmitted by the candidate device 1 to the second device 2. As for the first number $T_1$, one might either have it be transmitted by the second device 2 to the candidate device 1 (similar to the first embodiment above), or have its current value and any necessary increments be managed by a trusted central authority to which said legitimate reloading device 1 and the second device 2 can both get connected (similar to the third embodiment above).

In the end, of course, the second device 2 checks that the verification value $v_T$ received from the candidate device (1) is such that $v_T = PRF'_Q(T)$.

For example, the second number $T_2$ might be taken as the value of the reduced-coupon $x_i$ for some predetermined value of labelling index i. This embodiment (which looks like a message authentication rather than like an entity authentication) is advantageous in that it will "ring an alarm" in the case where an attacker, playing the role of a "man-in-the-middle", intercepts valid coupons coming from a legitimate coupon-reloading device, and provides phoney coupons to the coupon-consuming device.

The invention claimed is:

1. A method for cryptographic reduced-coupon reloading, wherein a coupon comprises a pseudo-random number $r_i = PRF_K(i)$, where i is an index for labeling the coupon, PRF is a predetermined pseudo-random function and K is a regeneration key, and a "reduced-coupon" $x_i$ such that $x_i = f(r_i)$, where $f$ is a predetermined one-way function, said method comprising the following steps:
   verifying that a number of reduced-coupons $x_i$ that are pre-stored in a second device has reached a predetermined low amount,
   acquiring, by a candidate device and the second device, a common value of a token T,
   transmitting from said candidate device a verification value $v_T$ to the second device,
   verifying, by the second device whether said verification value $v_T$ is given by $v_T = PRF'_Q(T)$, where PRF' is a predetermined keyed pseudo-random function identical to, or derived from, said pseudo-random function PRF, and where Q is an authentication key owned by the second device and known to the candidate device provided the candidate device is a legitimate reloading device, and
   if the verification is positive, storing one or several reduced-coupon(s) provided by the candidate device in the second device.

2. The method according to claim 1, wherein said authentication key Q is equal to, or derived from, said regeneration key K.

3. The method according to claim 1, wherein said token T is transmitted by the second device to the candidate device.

4. The method according to claim 3, wherein said token T is generated by a counter located in said second device.

5. The method according to claim 1, wherein said token T is transmitted by the candidate device to the second device.

6. The method according to claim 5, wherein the second device is provided with a counter, and in that the second device checks that the value of the token T just received from the candidate device is strictly greater than the current counter value.

7. The method according to claim 1, wherein the current value and any necessary increments of token T are managed by a trusted central authority to which said legitimate reloading device and the second device can both get connected.

8. The method according to claim 1, wherein said token T results from the combination of a first number $T_1$ and of a second number $T_2$, and in that said second number $T_2$ is transmitted by the candidate device to the second device.

9. The method according to claim 8, wherein said first number $T_1$ is transmitted by the second device to the candidate device.

10. The method according to claim 8, wherein the current value and any necessary increments of said first number $T_1$ are managed by a trusted central authority to which said legitimate reloading device and the second device can both get connected.

11. An electronic circuit for consuming cryptographic reduced-coupons containing a processor and a memory, wherein a coupon comprises, a pseudo-random number $r_i = PRF_K(i)$, where i is an index for labeling the coupon, PRF is a predetermined pseudo-random function and K is a regeneration key, and a "reduced-coupon" $x_i$ such that $x_i = f(r_i)$, where $f$ is a predetermined one-way function, said processor and said memory being arranged to:
   acquire a value of a token T using the processor,
   receive a verification value $v_T$,
   verify whether said verification value $v_T$ is given by $v_T = PRF'_Q(T)$, where Q is an authentication key and PRF' is a predetermined keyed pseudo-random function identical to, or derived from, said pseudo-random function PRF, and
   receive and store one or several reduced-coupons in the electronic circuit,
   wherein a number of reduced-coupons $x_i$ that are pre-stored in the electronic circuit has reached a predetermined low amount.

12. An Application Specific Integrated Circuit, comprising micro-components arranged to:
   acquire a value of a token T,
   receive a verification value $v_T$,
   verify whether said verification value $v_T$ is given by $v_T = PRF'_Q(T)$, where Q is an authentication key and PRF' is a predetermined keyed pseudo-random function identical to, or derived from, said pseudo-random function PRF, said pseudo-random function being adapted to generate a pseudo-random number $r_i = PRF_K(i)$, where K is a regeneration key, and i is an index for labeling a cryptographic coupon, said coupon comprising the pseudo-random number $r_i = PRF_K(i)$, and, a "reduced-coupon" $x_i$ such that $x_i = f(r_i)$, where $f$ is a predetermined one-way function, and
   receive and store one or several reduced-coupons $x_i$ in the Application Specific Integrated Circuit,
   wherein a number of reduced-coupons $x_i$ that are pre-stored in the Application Specific Integrated Circuit has reached a predetermined low amount.

13. A portable device to exchange data with a terminal, said portable device comprising an electronic circuit according to claim 11, and said portable device also comprising a memory for storing the regeneration key K and the authentication key Q.

14. The portable device according to claim 13, wherein said portable device is an RFID tag.

15. A terminal to exchange data with a portable device to provide it with reduced-coupons, wherein a coupon comprises, a pseudo-random number $r_i = PRF_K(i)$, where i is an index for labeling a cryptographic coupon, PRF is a predetermined pseudo-random function, and K is a regeneration key, and a "reduced-coupon" $x_i$ such that $x_i = f(r_i)$, where $f$ is a predetermined one-way function, said terminal comprising a data processing device arranged to:
   acquire a value of a token T,
   generate a verification value $v_T$ is given by $v_T = PRF'_Q(T)$, where PRF' is a predetermined keyed pseudo-random function identical to, or derived from, said pseudo-random function PRF and where Q is an authentication key known to the terminal,
   transmit said verification value $v_T$,
   generate a certain number of pseudo-random number $r_i$,
   compute associated reduced-coupon $x_i$, and
   transmit computed reduced-coupons to the portable device
   wherein a number of reduced-coupons $x_i$ that are pre-stored in the portable device has reached a predetermined low amount.

16. A system for cryptographic reduced-coupon reloading, comprising the portable device according to claim 13.

17. A non-transitory computer program product, comprising a computer usable medium having a computer readable program code embodied therein, said computer readable program code instructs a processor to execute the steps of the method according to claim 1.

18. A portable device to exchange data with a terminal, comprising an Application Specific Integrated Circuit according to claim 12, and said portable device also comprising a memory for storing the regeneration key K and the authentication key Q.

19. A system for cryptographic reduced-coupon reloading, comprising the terminal according to claim 15.

* * * * *